United States Patent Office 3,499,972
Patented Mar. 10, 1970

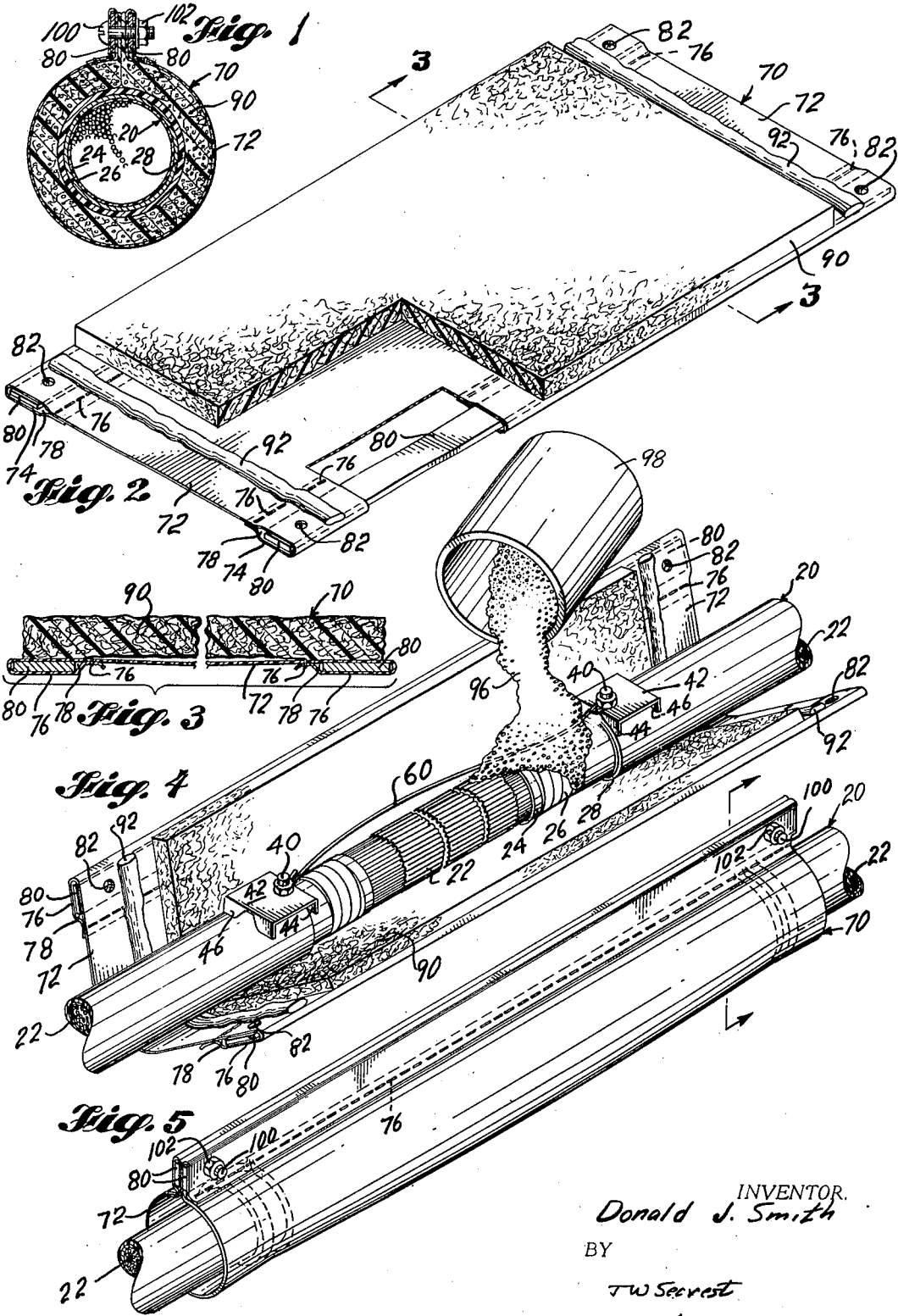

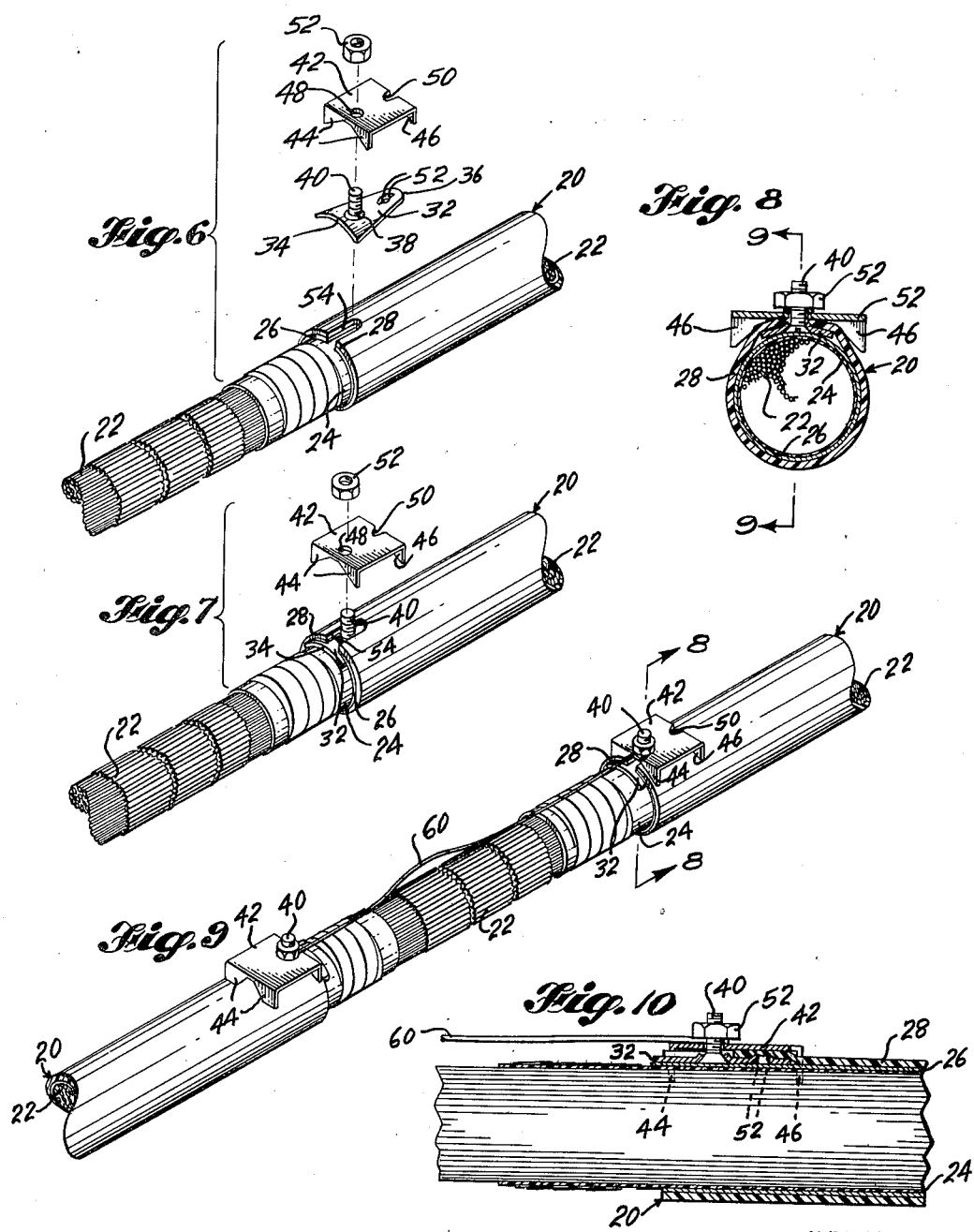

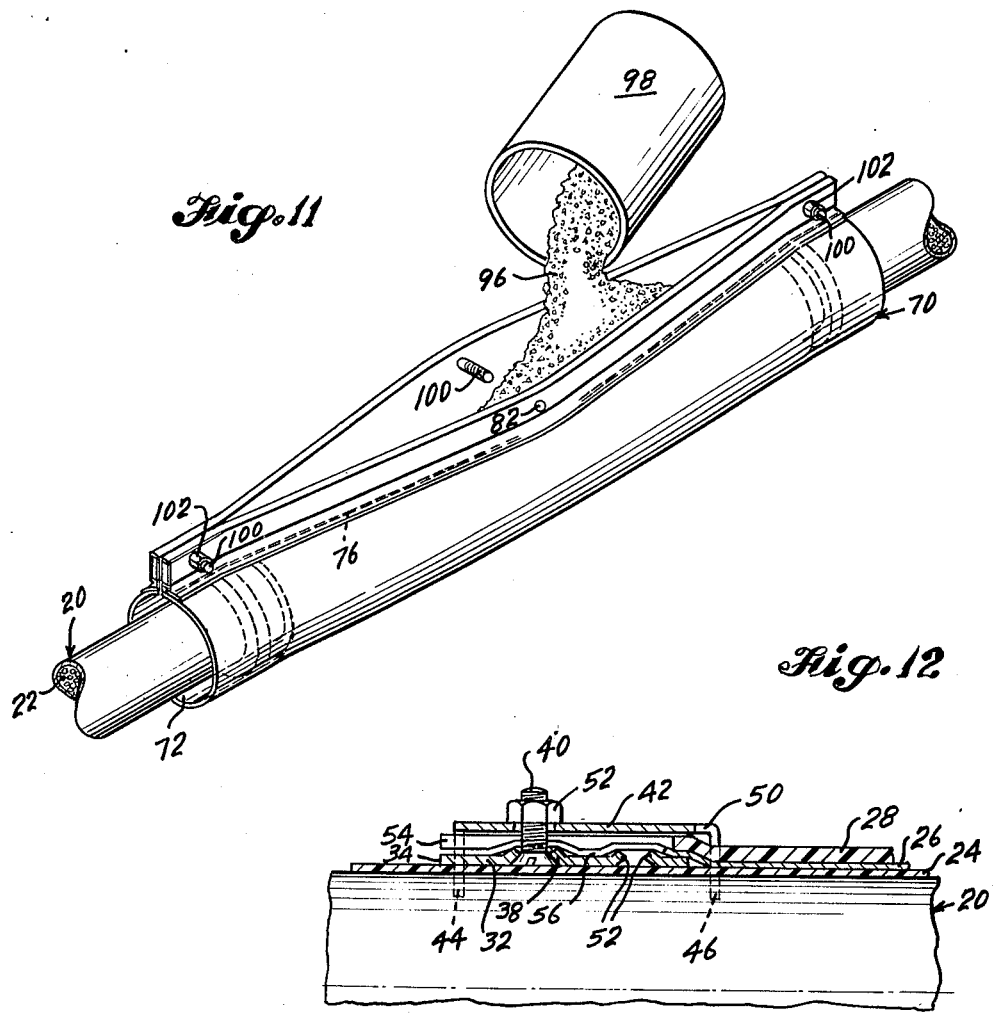

3,499,972
CONNECTOR AND CONNECTION FOR
SHEATH CABLE SHIELD
Donald J. Smith, Canoga Park, Calif., assignor to Smith-Schreyer & Assoc., Inc., a corporation of California
Filed Feb. 13, 1967, Ser. No. 615,718
Int. Cl. H02g 15/08
U.S. Cl. 174—88    11 Claims

ABSTRACT OF THE DISCLOSURE

This invention relates to apparatus and method for protecting a splice bundle for a cable comprising numerous wires and also for providing a continuous electrical circuit for the electrical shield for said cable.

Today, many telephone cables are being buried underground. As is well known these cables comprise many wires. In this regard see FIGURES 11 and 12 wherein there is illustrated a cable 20 having numerous wires 22 in the interior of the cable. The insulation for the numerous electrical wires 22 varies with the manufacture of the electrical cable and the specifications to be met. In one cable for example, there may be a dielectric insulating material 24. This dielectric insulating material 24 may be a polyvinyl alcohol or may be polyvinyl chloride. Some manufacturers also use polyethylene in addition to the polyvinyl alcohol. Then, in order to electrically isolate the cable 20 and to maintain in the cable 20 its substantially the same electrical potential, there is an electrical conducting material 26. 26 may be an aluminum tube, of thin wall construction, so as to be readily deformable and yet to supply the electrical circuit. Outside of the electrical shield 26 there is an electrical insulating or electrical dielectric material 28. 28 may be a plastic such as polyvinyl chloride or polyvinyl alcohol. The electrical insulating material 28 must also be resistant to the action of chemicals in the ground as the cable 20 is buried in the ground.

In making a connection with one of the wires 22 to the cable 20 it is necessary to break through or cut through the outer insulation 28, the electrical shield 26 and the inner insulation 24. After the connection has been made with the wire or wires 22 and the cable 20 it is then necessary to seal the cable 20 so as to be able to withstand the action of the chemicals of the ground.

This invention is directed to a method and apparatus for continuing the electrical circuit provided by the electrical shield 26 and also to seal the splice bundle in the cable 20 so as to be able to withstand weathering and aging. The providing of the continuous electrical circuit for the electrical shield 26 is done by means of a shield connector, and the providing of a protective material for the splice bundle in the cable 20 is done by means of an enclosure. Accordingly, it is an object of this invention to provide a shield connector and an enclosure which can be used out in the open as well as in a sheltered place or can be used out in a field operation; a further object is to provide an enclosure in which no individual fitting of end seals is necessary; another object is to provide an enclosure whereby it is possible to see the contents of the enclosure to determine if proper encapsulation is taking place; a further object is to provide an enclosure which requires less encapsulating resin than previously used enclosures; another object is to provide an enclosure whereby it is easy to attach the encapsulation enclosure around the splice bundle; another object is to provide an enclosure whereby there is a resin seal to retain the liquid resin in the enclosure; a further object is to provide an enclosure where there is no cutting or trimming required to fit the enclosure to the splice bundle; another object is to provide an enclosure having easy access to the enclosure so as to be able to readily add liquid resin to the enclosure to enclose the splice bundle; a further object is to provide an enclosure having a sheath clamping device which makes a positive closure; another object is to provide an enclosure employing an expanding resin and which resin upon curing expands to a larger volume than in the uncured state; a further object is to provide an enclosure employing a low-cost spacer to wrap around the splice bundle and to lessen the volume of expensive liquid resin required for encapsulation; an additional object is to provide an enclosure having rigid but formable bars forming a wide top opening which allows service wires and cables to be brought in through the top opening yet capable of being clamped together after pouring the resin to protect the fresh resin from contamination by dirt, rocks or moisture, said bars also providing rigidity to prevent the enclosure from sagging due to the weight of the poured resin; another object is to provide an enclosure having a sheath clamping device which positively prevents sheath turning or movement after the resin has cured; an additional object is to provide an enclosure which lowers the cost of installation as compared with previously used enclosures as less costly materials and less installation time is required; an additional object is to provide an enclosure which has an open top design so as to allow escape of air bubbles from the liquid resin to lessen the possibility of voids and air pockets in the encapsulating resin; a further object is to provide a shield connector which provides a continuous electrical connection for the electrical shield in the cable and around the splice bundle; another object is to provide a shield connector which penetrates and cuts through the insulation for the electrical shield in the cable to make a positive electrical contact with the electrical shield; another object is to provide a shield connector which makes a positive mechanical lock with the electrical shield and also with the cable; an additional object is to provide a shield connector which is easy to install on the electrical cable and in contact with the electrical shield; an additional object is to provide a shield connector which can be installed in a relatively short time period; an additional object is to provide a combination of an enclosure and a shield connector which is relatively inexpensive; and, another object is to provide a combination of an enclosure and a shield connector which is easy to install and requires only a small amount of time to install.

These and other important objects and advantages of the invention will be more fully brought forth upon reference to the accompanying drawings, the detailed specification of the invention and the appended claims.

In the drawings:

FIGURE 1 is a lateral cross-sectional view illustrating the enclosure as applied to a splice bundle in a cable;

FIGURE 2 is a fragmentary perspective view of a preferred embodiment of the enclosure constructed in accordance with the teachings of this invention;

FIGURE 3, taken on line 3—3 of FIGURE 2, is a lateral cross-sectional view illustrating the components and construction of the enclosure;

FIGURE 4 is a perspective view looking at the cable and splice bundle in the enclosure and illustrates the positioning of the cable and splice bundle in the enclosure;

FIGURE 5 is a perspective view of the enclosure and splice bundle after the enclosure has been positioned around the splice bundle;

FIGURE 6 is an exploded view of the shield connector and the cable prior to positioning the shield connector in the cable;

FIGURE 7 is an exploded perspective view of the shield connector and the cable with the shield connector partially in the assembled state in the cable;

FIGURE 8 is a lateral cross-sectional view of the shield connector in the assembled state on the cable;

FIGURE 9 is a perspective view of a cable and which shows the electrical shield of the cable destroyed and discontinuous and which also shows two shield connectors connected by an electrical wire for making a complete electrical circuit with respect to the shield connector on the cable;

FIGURE 10 is a longitudinal cross-sectional view, one method for connecting the shield connector to the electrical shield of the cable;

FIGURE 11 is a perspective view illustrating the addition of the resin to the enclosure so as to allow the resin to work around the cable in the enclosure; and, FIGURE 12 is a fragmentary longitudinal cross-sectional view illustrating the manner in which the shield connector is applied to the cable so as to make a positive electrical contact with the electrical shield on the cable.

In FIGURES 6, 7, 8, 9, 10 and 12 there is illustrated a shield connector 30. It is seen that this shield connector comprises a tapered insert portion 32 having a broad end 34 and a narrow end 36. Also, it is seen that the tapered insert portion 32 is curved so as to generally conform to the curve of the cable 20. In the insert portion 32 there is an opening 38. A threaded stud 40, a bolt, projects upwardly from the concave part of 32 and through the opening 38 so as to project upwardly from the convex part of 32. The shield connector 30 also comprises a bridge having a base 42 and on a first end there are two downwardly directed spaced-apart legs 44 and on a second end there are two downwardly directed spaced-apart legs 46. It is seen that the two legs 44 comprise a recess for conforming to the shape or curve of the cable 20 and also that the two spaced-apart legs 46 provide a recess to conform to the shape or curve of the cable 20. Near the first end and in the base of the bridge 42 there is an opening or passageway 48. Near the second end there may be a cut or recess 50. Also, there is a nut 52 for threading onto the stud or bolt 40. In FIGURE 6 it is seen that on the tapered insert portion or tapered base 32 that there are two upwardly directed and raised tangs 52. These tangs 52 are near the narrow end 36.

In FIGURE 10 there is illustrated one manner of attaching the shield connector 30 to the cable 20. This can be accomplished by cutting the outer insulating material 28 and slipping the tapered base 32 under the outer insulating material 28. Then, the bridge or upper portion 42 is assembled onto the bolt 40 so as to clamp the bridge portion onto the cable 20. The legs 46 bite into the outer insulating material 28 so as to firmly position the shield connector 30 with respect to the cable 20 and also to have the tapered base portion 32 contact the electrical shield 26.

In FIGURE 12 there is illustrated a preferred manner of connecting the shield connector 30 to the cable 20. In this manner the outer insulating material 28 is cut and a portion removed so as to leave the inset 54. Further, the electrical shield 26 is cut and a portion removed so as to leave the recess or void 56. Then, the electrical shield 26 is removed or elevated from the inner dielectric insulating material 24. The tapered insert 32 is moved and positioned so as to be next to the inner dielectric insulating material 24 and in contact with the electrical shield 26. The bolt 40 projects upwardly through the opening or recess 56 and also through the opening or recess 54. The bridge 42 is positioned over the tapered base 32 and the nut 52 tightened onto the bolt 40 so as to have the legs 44 and 46 bite into the outer insulating material 28 and to draw the tapered base 32 and the bridge 42 together. Now, in FIGURE 12 it is seen that the raised tangs 52 contact and bite into the electrical shield 26. Further, it is seen that the tapered base portion around the opening 38 is upwardly directed and bites into the electrical shield 26. Actually, the tangs 52 and the base portion 32 around the opening 38 are sharp and cut into the electrical shield 26. This is important as some manufacturers coat the electrical shield 26 with polyethylene, on both surfaces. Therefore, the raised tangs 52 are necessary to cut through the dielectric insulating material, polyethylene, so as to establish electrical contact with the electric shield 26.

In FIGURE 9 there is illustrated the manner in which the electric shields function. It is seen that there is a break or opening 58 in the cable 20. The outer electrical insulating material 28, the electrical shield 26 and the inner dielectric insulating material 24 have been removed so as to expose the ends of the wires 22. It is necessary to have a continuous electrical circuit for the electric shield 26. Therefore, on one side of the break 58 there is placed a shield connector 30 and on the other side of the break there is placed another shield connector 30. Then, an electric wire 60 is attached to the bolt 40 of the first shield connector 30 and also to the bolt 40 of the second shield connector 30. In this manner there is established a continuous electrical circuit in the cable 20 and with respect to the electric shield 26.

The materials of construction may be many which are capable of conducting electricity. The electrical shield 26 may be aluminum, copper or other suitable electrical conducting material. The tapered base 32 and the bridge 42 may be stamped metal parts such as iron or steel stamped parts and likewise the nut and bolt may be steel. The wire 60 may be copper or aluminum or other suitable material for conducting electricity.

In FIGURES 2 and 3 there is illustrated an enclosure 70. This enclosure comprises a sheet of flexible material 72. A suitable material 72 is polyethylene having a thickness of six (6) mils or ten (10) mils, for example. The sheet 72 is translucent and can be seen through so as to see the contents in the enclosure 70. It is seen that the other edges of the sheet 72 are folded back on themselves at 74 and stitched at 76 to form pockets 78. In the pockets 78 there is positioned a bar 80. The bar 80 should be capable of being deformed. A suitable material for the bar 80 is aluminum. Aluminum can be bent to one configuration and then be bent to another configuration. In the edge of the sheet 72 and in the bar 80 there are positioned three spaced apart passageways 82. Two of the passageways are at the end, one at each end, and one of these passageways is centrally located. On the interior surface of the sheet 72 there is position a porous mat 90. It is seen that this porous mat 90 is of less lengths than the sheet 72. The porous mat 90 may be a foam such as polyurethan foam, polystyrene foam, polyvinyl chloride foam, polyvinyl alcohol foam or may be synthetic hair, to name a few materials of construction. The porous mat 90 may be adhered to the plastic sheet 72 by means of a resin along the edges of the mat and also along the edges of the plastic sheet 72. Or, the porous mat 90 may be adhered to the plastic sheet 72 by means of material having an adhesive material on each face. Near each end of the sheet 72, and interiorly of the end passageways 82 there is a lateral strip 92 of an adge sealing means. The edge sealing means 90 may be uncured butyl rubber.

In FIGURE 4 there is illustrated the placing of the cable 20 in the enclosure 70 and the folding of the sheet 72, the porous mat 90 and the edge sealing means 92 around the cable 20 where there is the break 58. There is schematically illustrated the pouring of resin 96 from a container 98 onto the cable 20 and over the break 58 and into the interior of the enclosure 70. The illustration in FIGURE 4 is to show the relationship of the sheet 72, the porous mat 90, and the edge sealing means 92. The preferred manner of adding the resin to the enclosure is illustrated in FIGURE 11. In FIGURE 11 it is seen that the bars 80 are bent outwardly at the middle portions. A bolt 100 is placed in the passageways 82 and a nut 102 is tightened onto the bolt 100, at each end of the bars 80 and the enclosure 70. With the tightening of the nut and bolt 102 at each end of the enclosure 70 the edge sealing means 92 are firmly pressed against the cable 20. As seen in FIGURE 11 the central portion of the encloure 70 is spread apart so as to define a central opening. It is possible to add the resin to the enclosure 70 so that it can flow around the cable 20 and the break in the cable and also flow around the shield connector and the connecting wire 60. Then, the bolt 100 can be pushed through the openings 82 in the bars 80 and the sheath grip 70, in the central portion of the bars in the enclosure, and a nut screwed onto the bolt so as to draw the two bars close together so as to seal the pining.

The resin 96 which is added to the enclosure 70 is normally a liquid resin. It is a polyurethane resin which expands upon curing. The coefficient of expansion, upon curing, may be approximately five (5%) percent. An expanding resin is of value as it means that the enclosure is more fully filled with the cooling of the resin and therefore there is less possibility of a void and possible breaking into the enclosure by means of the elements. Of course, a solid resin may be used in place of a liquid resin. Small solid pellets of resin may be mixed with a catalyst to form a mixture. The mixture may be poured into the enclosure and worked around the cable 20, the break 58 in the cable and the wire 60. The small solid pellets of resin react and become liquid so as to flow more fully around the break 58 in the cable.

The function of the porous mat 90 is that of a spacing element. It assures that the sheet 72 of the enclosure 70 is spaced away from the cable 20 and the break 58 in the cable. In this manner it is assured that the break 58 in the cable is completely covered by a protective resin. A secondary concern is the fact that the cost of the porous mat 90 is less than the cost of the liquid resin 96. Therefore, it is more economical to utilize a porous mat 90 in place of a more expensive resin 96.

It is useful in cable systems where gas pressure is maintained within the cable sheath to be able to transmit this gas pressure through the poured enclosure. A method to insure the transmission of this gas pressure is to employ a sheet of plastic with a bead of sealant material on three of the four sides and of an appropriate size of said sheet of plastic. After the splice bundle is completed, the sheet is placed around the bundle and all the edges tightly pressed together. This forms a sealed envelope around the splice bundle. The enclosure is then poured full of resin as before; but now the resin is held outside the bundle and an air or gas passage is maintained through the bundle.

From the foregoing it is seen that I have provided an enclosure which may be readily utilized by a person in the field for repairing a break in a cable or for repairing a cable after the cable has been opened and a wire or wires spliced into the cable. Further, the break 58 in the cable and the cable itself have been completely covered with the protective resin. With the expanding resin the shield connector is firmly positioned with respect to the cable and the shield connector is not free to move. Further, with the use of the protective resin it is possible to have the sheet 72 and the porous mat 90 partially destroyed or damaged and yet the cured protective resin still envelopes the break 58 in the cable and part of the cable 20 so as to protect the individual wires in the cable. Further, the protective resin has flowed around the wire 60 so as to protect the wire 60 and also to assist in firmly positioning the wire 60 with respect to the shield connectors.

Having presented my invention what I claim is:

1. As an article of manufacture, a connector for making electrical contact to the shield of an electrical cable having a protective sheath overlying said shield and an insulating layer underlying said shield comprising:
    a base of conductive material adapted to be brought into engagement with said shield, said base being curved to conform to the inner surface of said shield;
    screw threaded stud means mounted on said base and extending upwardly therefrom; and
    a bridge adapted to be brought into engagement with said protective sheath, said bridge including means curved to conform to the outer surface of said sheath, said bridge having a passageway receiving said stud means, a nut engaging said stud means fastening said bridge to said base.

2. The connector of claim 1 wherein said curved means of said bridge comprises downwardly depending legs joined by a strip of material having a curved lower surface.

3. The connector of claim 1 wherein said base is tapered so that one end is narrower than the other end.

4. The connector of claim 1 wherein said base is provided with at least one upwardly projecting tang.

5. As an article of manufacture, a shield connector comprising:
    a base of conductive material, said base being tapered so that one end is narrower than the other end and curved so that the edges curve downwardly, said base having an upwardly and outwardly directed tang;
    an upwardly directed screw threaded stud mounted on said base;
    a bridge having a first end and a second end, the first end having two spaced apart legs defining a first recess, the second end having two spaced apart legs defining a second recess, a passageway in said bridge receiving said stud; and
    screw threaded fastening means engaging said stud fastening said base, said bridge and said stud together.

6. A combination of a cable and a shield connector, said combination comprising:
    an electrical cable having an outer protective sheath and a conductive shield inside of said sheath;
    a base positioned at least partially under said protective sheath in electrical contact with said shield, said base being curved to conform to the inner surface of said shield;
    an upstanding screw threaded stud mounted on said base, said stud passing through said shield and said sheath;
    a bridge positioned over said sheath above said base, said bridge including means curved to conform to the outer surface of said sheath, said bridge having a passageway therein receiving said stud means; and
    screw threaded fastening means engaging said stud means fastening said bridge to said base and clamping said shield therebetween.

7. The combination of claim 6 wherein said base is positioned under said shield, said shield and said sheath both being cut away permitting the passage of said stud means therethrough.

8. The combination of claim 7 wherein said base has an upwardly projecting tang frictionally engaging said shield and in electrical contact therewith.

9. The combination of claim 6 wherein said curved means of said bridge are downwardly depending legs joined by a web of material forming a curved lower surface.

10. The combination of claim 6 wherein said base is tapered so that the end of the base positioned the furtherest under said sheath is narrower than the other end.

11. A combination of a cable and shield connectors comprising:
    an electrical cable having an outer protective sheath and a conductive shield inside of said outer protective sheath, there being a discontinuity in said shield so as to have a pair of ends of said shield;

a pair of shield connectors, each of said shield connectors being connected to one of said ends of said shield, each of said shield connectors comprising:

a base positioned at least partially under said protective sheath in electrical contact with said shield, said base being curved to conform to the inner surface of said shield;

an upstanding screw threaded stud mounted on said base, said stud passing through said shield and said sheath;

a bridge positioned over said sheath above said base, said bridge including means curved to conform to the outer surface of said sheath, said bridge having a passageway therein receiving said stud means;

screw threaded fastening means enaging said stud means fastening said bridge to said base and clamping said shield therebetween; and an electrical conductor fastened to said stud electrically connecting said shield connectors to each other.

References Cited

UNITED STATES PATENTS

| | | | |
|---|---|---|---|
| 3,223,775 | 12/1965 | Nugent. | |
| 3,377,422 | 4/1968 | Trimble et al. | 174—88 |
| 3,235,651 | 2/1966 | Tepner | 174—21 |
| 3,253,247 | 5/1966 | Vos | 339—95 |

DARRELL L. CLAY, Primary Examiner

U.S. Cl. X.R.

174—76, 78, 93; 339—95